United States Patent
Cudak et al.

(10) Patent No.: US 10,298,574 B2
(45) Date of Patent: May 21, 2019

(54) MANAGING CLIENT DEVICE CREDENTIALS TO FACILITATE SECURE COMPUTER SYSTEM CONFIGURATION

(71) Applicant: Lenovo Enterprise Solutions (Singapore) Pte. Ltd., Singapore (SG)

(72) Inventors: Gary D. Cudak, Wake Forest, NC (US); Jarrod B. Johnson, Raleigh, NC (US); Matthew A. Steele, Durham, NC (US); Andrew H. Wray, Hillsborough, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 337 days.

(21) Appl. No.: 15/239,886

(22) Filed: Aug. 18, 2016

(65) Prior Publication Data
US 2018/0054437 A1    Feb. 22, 2018

(51) Int. Cl.
*H04L 9/00* (2006.01)
*H04L 29/06* (2006.01)
*G06F 21/50* (2013.01)
*G06F 21/33* (2013.01)

(52) U.S. Cl.
CPC .......... *H04L 63/0876* (2013.01); *G06F 21/33* (2013.01); *G06F 21/50* (2013.01); *H04L 63/162* (2013.01); *Y02D 30/30* (2018.01)

(58) Field of Classification Search
CPC ... H04L 63/162; H04L 63/0876; G06F 21/33; G06F 21/50
See application file for complete search history.

(56) References Cited

U.S. PATENT DOCUMENTS

| | | | | |
|---|---|---|---|---|
| 6,657,999 | B1 * | 12/2003 | Brewer | H04L 12/40097 370/351 |
| 6,747,979 | B1 * | 6/2004 | Banks | H04L 12/40091 370/401 |
| 7,580,409 | B1 * | 8/2009 | Swenson | H04L 49/253 370/392 |
| 8,572,717 | B2 * | 10/2013 | Narayanaswamy | H04L 63/0245 726/12 |
| 9,207,417 | B2 * | 12/2015 | Coffey | G02B 6/43 |
| 9,270,791 | B2 * | 2/2016 | Mittapalli | H04L 69/324 |

\* cited by examiner

*Primary Examiner* — Beemnet W Dada
(74) *Attorney, Agent, or Firm* — Jeffrey L. Streets

(57) ABSTRACT

A method includes a client device forming a link-layer protocol packet having a field that includes first credentials of the client device and sending the link-layer protocol packet to a directly attached network device while the client device is in a first configuration. The method further includes a management system obtaining the first credentials from the network device and using the first credentials to access the client device and change the client device from the first configuration to a second configuration. Optionally, a computer system may include a plurality of client devices that implement the method to facilitate securely configuring the entire computer system. Preferably, each client device generates system-unique first credentials.

20 Claims, 4 Drawing Sheets

50

```
LLDP Local Information:
Chassis ID Type.........................................MAC address
Chassis ID.................................................0015.77d8.4360
Port ID Type..............................................Port component
Port ID......................................................25
TTL............................................................120 (secs)
Port Description........................................Port_25      52
System Name.............................................[zero length]
System Description....................................AT-8100S/24C
System Capabilities- Supported..............Bridge, Router
- Enabled....Bridge, Router
Management Addresses..........................0.0.0.0
Port VLAN ID (PVID)..............................1
Port & Protocol VLAN- Supported........No
- Enabled...No
- VIDS......0
VLAN Names............................................Default_VLAN
Protocol IDs...............................................
MAC/PHY Auto-negotiation...................Supported / Enabled
Avertised Capability........1000BasTFD, 100BaseTXFD, 100BaseTX,
10BaseTFD, 10BaseT
Operational MAU Type...30 (1000BaseTFD)
```

FIG. 2

MANAGING CLIENT DEVICE CREDENTIALS TO FACILITATE SECURE COMPUTER SYSTEM CONFIGURATION

BACKGROUND

Field of the Invention

The present invention relates to methods and system of maintaining security during an initial configuration of a computer system.

Background of the Related Art

High-performance clusters (HPC) and datacenter installations are large-scale computer systems including a large number of compute nodes that are configured to work in a particular manner. Aside from the hardware configuration of individual nodes and their interconnections, each compute node in such a large computer system operate software or firmware that must also be set up or configured. Unfortunately, it can take a considerable amount of time for an administrator to configure such a large number of nodes.

Furthermore, it is important to maintain the security of the computer system as it is being configured. To remain secure during the bring-up phase of a computer system and until the computer system is configured by the owner, it is desirable for each compute node in the computer system to have credentials that are unknown and difficult to discover, but implementing the use of unknown credentials can directly inhibit automation and ease of configuring the computer system. Current methods of configuring a large computer system may not be able to prevent man-in-the-middle attacks which can result in long-term security issues for the entire datacenter.

BRIEF SUMMARY

One embodiment of the present invention provides a method comprising a client device forming a link-layer protocol packet having a field that includes first credentials of the client device and sending the link-layer protocol packet to a directly attached network device while the client device is in a first configuration. The method further comprises a management system obtaining the first credentials from the network device and using the first credentials to access the client device and change the client device from the first configuration to a second configuration.

Another embodiment of the present invention provides a method comprising forming, by each of a plurality of client devices, a link-layer protocol packet having a field that includes first credentials of the client device, and sending, by each of the plurality of client devices, the link-layer protocol packet from the client device to a directly attached network device while the client device is in a first configuration. The method further comprises a management system obtaining the first credentials of each of the plurality of client devices from the network device, and the management system using the first credentials of each of the plurality of client devices to access each of the client devices and change each of the client devices from the first configuration to a second configuration.

Yet another embodiment of the present invention provides a computer program product comprising a non-transitory computer readable storage medium having program instructions embodied therewith, where the program instructions are executable by a processor to cause the processor to perform a method. The method comprises a client device forming a link-layer protocol packet having a field that includes first credentials of the client device and sending the link-layer protocol packet to a directly attached network device while the client device is in a first configuration. The method further comprises a management system obtaining the first credentials from the network device and using the first credentials to access the client device and change the client device from the first configuration to a second configuration.

BRIEF DESCRIPTION OF THE SEVERAL VIEWS OF THE DRAWINGS

FIG. 2 is an example of data that may be included in a link-layer discovery protocol (LLDP) packet.

DETAILED DESCRIPTION

Figure 1:
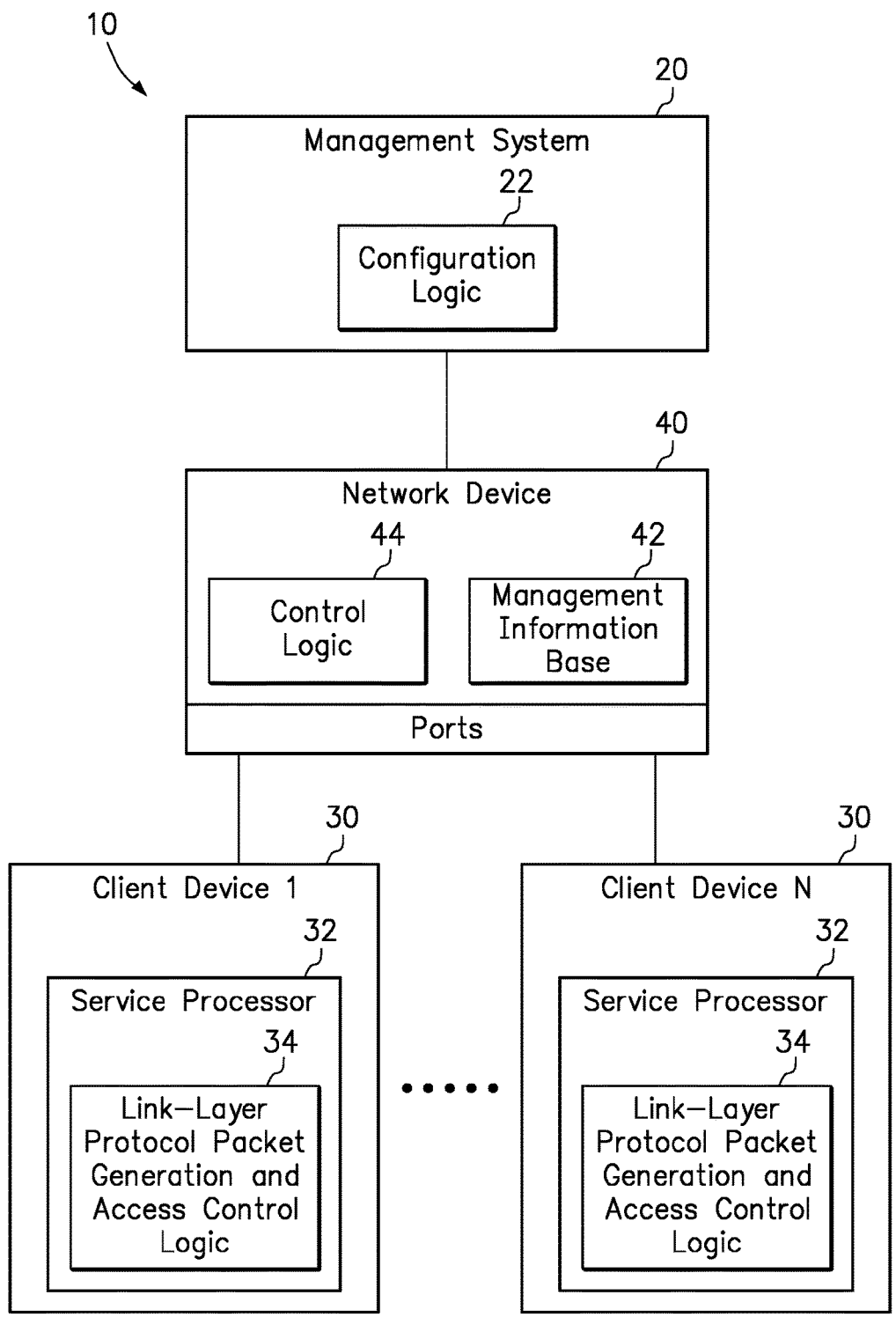
FIG. 1 is a diagram of a computer system including a management system and a plurality of client devices directly attached to a network device.

One embodiment of the present invention provides a method comprising a client device forming a link-layer protocol packet having a field that includes first credentials of the client device and sending the link-layer protocol packet to a directly attached network device while the client device is in a first configuration. The method further comprises a management system obtaining the first credentials from the network device and using the first credentials to access the client device and change the client device from the first configuration to a second configuration.

The client device may be any type of compute node, but in high-performance clusters and datacenters the client device is typically a server. In various embodiments, the client device is an enterprise server having an onboard management device, which may be a service processor such as an integrated management module (IMM) or baseboard management module (BMC). Furthermore, the client device may include a network adapter to facilitate direct attachment to the network device, such as an Ethernet switch. The network device will typically include multiple ports for direct connection with multiple client devices and the management system.

A link-layer protocol packet is a data packet, such as an Ethernet packet, including a frame containing a sequence of type-length-value (TLV) structures. For example, the link-layer protocol packet may be a link-layer discovery protocol (LLDP) packet including a destination address (i.e., media access control address), a source address (i.e., media access control address), chassis ID, port ID, time-to-live value, and various optional fields. Embodiments of the present invention may form a link-layer protocol packet having a field that includes first credentials of a client device by replacing predetermined content of a field of the link-layer protocol packet with the first credentials. Optionally, the first credentials may be a type-length-value field, such as a system description field.

Optionally, an onboard management device of the client device may generate the first credentials, for example as a function of a random string. Such first credentials may not be available or known during shipment of the client device, but are generated upon startup of the client device. Regardless of the exact manner of generating the first credentials, the first credentials are preferably unique to the client device among a plurality of client devices directly attached to the network device or among all client devices within the computer system. In one option, the first credentials may be generated using a pre-defined structure that results in credentials having a unique value. As a specific example, the pre-defined structure may include "userid:<serial_num>+<random_string>" and "password:<random_string>". Other schemes and algorithms may be incorporated for this purpose.

Furthermore, the link-layer protocol packet may be sent by an onboard management device of the client device. For example, the onboard management device may be selected from an integrated management module and a baseboard management module. Optionally, the onboard management device may cause the client device to send the link-layer protocol packet, which includes the first credentials, over a network connection to the network device.

The network device preferably does not forward the link-layer protocol packet. For example, the client device and the network device may use a bridge-filtered protocol in which the client device sends the link-layer protocol packet to an address that the network device will not forward. In response to receiving the link-layer protocol packet from the client device, the network device may store the first credentials. Optionally, the network device may store the first credentials in a Management Information Base in association with a port identifier that identifies a port to which the client device is attached.

A management system having access rights to read the Management Information Base will be able to subsequently read the first credentials of the client device and any other client device that is directly attached to the network device. For example, the management system may communicate with the network device using a Simple Network Management Protocol (SNMP). In one option, the management system may obtain port data from the network device and parse the port data to identify a field of the port data that has a character sequence matching an expected character sequence consistent with a credential.

The management system may use the first credentials to access the client device by establishing a connection there between. Accordingly, the management system may configure the client device from the first configuration to the second configuration. In a further option, the management system may replace the first credentials of the client device with second credentials. Still further, the management system may prevent the client device from sending a link-layer protocol packet with the second credentials. Rather, any subsequent LLDP packet transmission may look like a normal LLDP implementation without any of the fields modified to include credentials.

Another embodiment of the present invention provides a method comprising forming, by each of a plurality of client devices, a link-layer protocol packet having a field that includes first credentials of the client device, and sending, by each of the plurality of client devices, the link-layer protocol packet from the client device to a directly attached network device while the client device is in a first configuration. The method further comprises a management system obtaining the first credentials of each of the plurality of client devices from the network device, and the management system using the first credentials of each of the plurality of client devices to access each of the client devices and change each of the client devices from the first configuration to a second configuration. In one option for this method, the plurality of client devices may include a first plurality of client devices directly attached to a first network device and a second plurality of client devices directly attached to a second network device, wherein the management system obtains the first credentials of each of the first plurality of client devices from the first network device and the first credentials of each of the second plurality of client devices from the second network device.

Yet another embodiment of the present invention provides a computer program product comprising a non-transitory computer readable storage medium having program instructions embodied therewith, where the program instructions are executable by a processor to cause the processor to perform a method. The method comprises a client device forming a link-layer protocol packet having a field that includes first credentials of the client device and sending the link-layer protocol packet to a directly attached network device while the client device is in a first configuration. The method further comprises a management system obtaining the first credentials from the network device and using the first credentials to access the client device and change the client device from the first configuration to a second configuration. Embodiments of the present invention may, without limitation, be implemented via program instructions executed by an onboard management device (i.e., IMM, BMC) of a client device (i.e., server) and program instructions executed by a management system, perhaps as part of a more general management software (i.e., xClarity™ software available from Lenovo).

The foregoing computer program product may further include program instructions for implementing or initiating any one or more aspects of the methods described herein. Accordingly, a separate description of the methods will not be duplicated in the context of a computer program product.

FIG. 1 is a diagram of a computer system 10 including a management system 20 and a plurality of client devices 30 directly attached to a network device 40. The management system 20 is a computer with configuration logic 22 for performing management system functions in accordance with embodiments of the present invention. For example, the configuration logic 22 may include program instructions for reading client device credentials from a Management Information Base 42 of the network device 40, using the client device credentials to establish a connection with a respective client device 30, and configuring the client device. The program instructions of the configuration logic 22 may similarly configure any number of client devices 30 directly attached to the network device 40. If the management system is connected to other network devices, then the management system may similarly configure client devices directly attached to those other network devices.

The network device 40 includes the Management Information Base (MIB) 42 that includes data for the directly attached client devices and further includes control logic 44. While the control logic 44 may control any of the various normal functions of a network device (i.e., network switch), the control logic 44 causes the network device to perform network device functions in accordance with embodiments of the present invention. For example, the control logic 44 may include program instructions or circuits for receiving a link-layer protocol packet from each client device 30 and storing credentials associated with each client device in the Management Information Base 42. Furthermore, the network device will route communications between the management system 20 and the appropriate client device 30.

The computer system 10 may include any number of client devices 30 directly attached to the network device 40 via a port. A network device or switch may include any number of ports, such as a 50-port switch. Each client device 30 may include onboard management, such as a service processor, that executes logic implementing functions of the client device in accordance with embodiments of the present invention. In the embodiment shown, the service processor 32 executes link-layer protocol packet generation and access control logic 34. The logic 34 may cause the respective client device 30 to generate first credentials, form a link-layer protocol packet including the first credentials, and send the link-layer protocol packet to the network device. Furthermore, the logic 34 may allow the management system 20 to subsequently use those first credentials to gain access to the client device, change the client device from a first configuration to a second configuration, replace the first credentials with second credentials, and prevent the client device from sending a link-layer protocol packet containing the second credentials.

FIG. 2 is an example of data 50 that may be included in a link-layer discovery protocol (LLDP) packet. In this illustration, the service processor 32 may modify the system description field 52, such that the actual system description (i.e., "AT-8100S/24C") may be replaced with first credentials for the purpose of sending a link-layer protocol package to the network switch in response to an initial startup of the client device.

Figure 3:
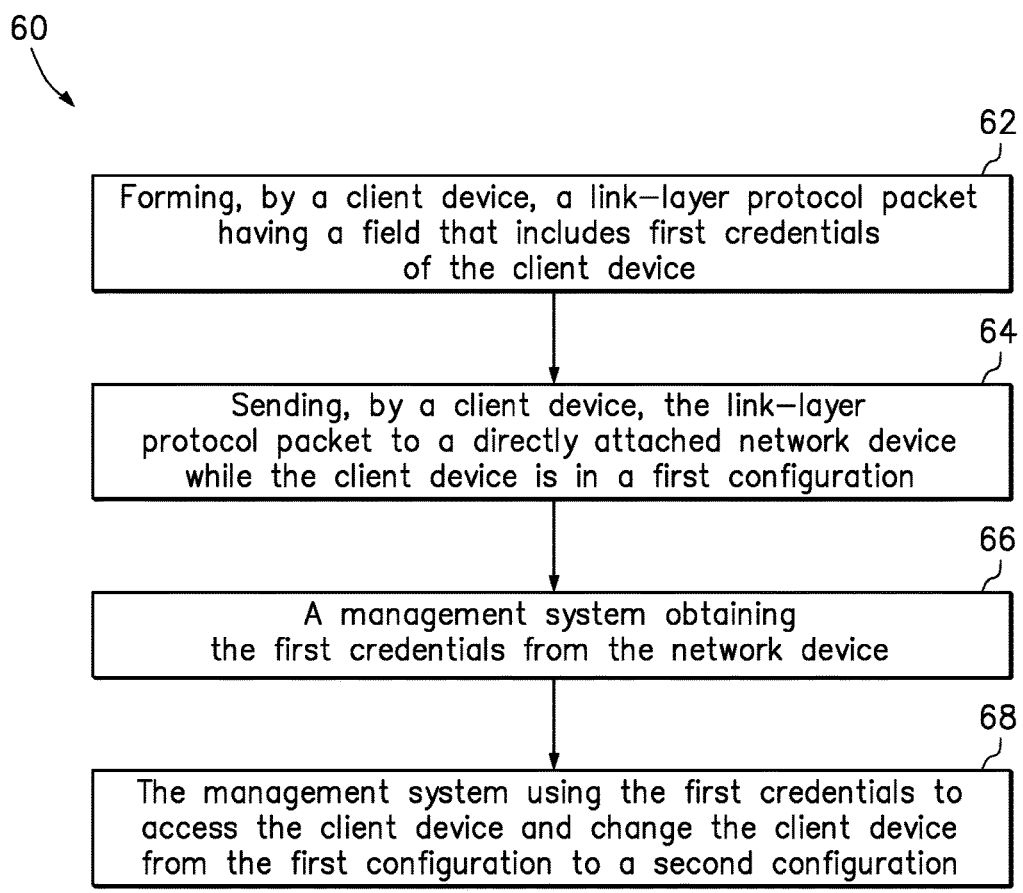
FIG. 3 is a flowchart of a method according to one embodiment of the present invention.

FIG. 3 is a flowchart of a method 60 according to one embodiment of the present invention. Step 62 of the method includes forming, by a client device, a link-layer protocol packet having a field that includes first credentials of the client device. Step 64 includes sending, by the client device, the link-layer protocol packet to a directly attached network device while the client device is in a first configuration. In step 66, the method include a management system obtaining the first credentials from the network device. Then, in step 68, the management system uses the first credentials to access the client device and change the client device from the first configuration to a second configuration.

Figure 4:
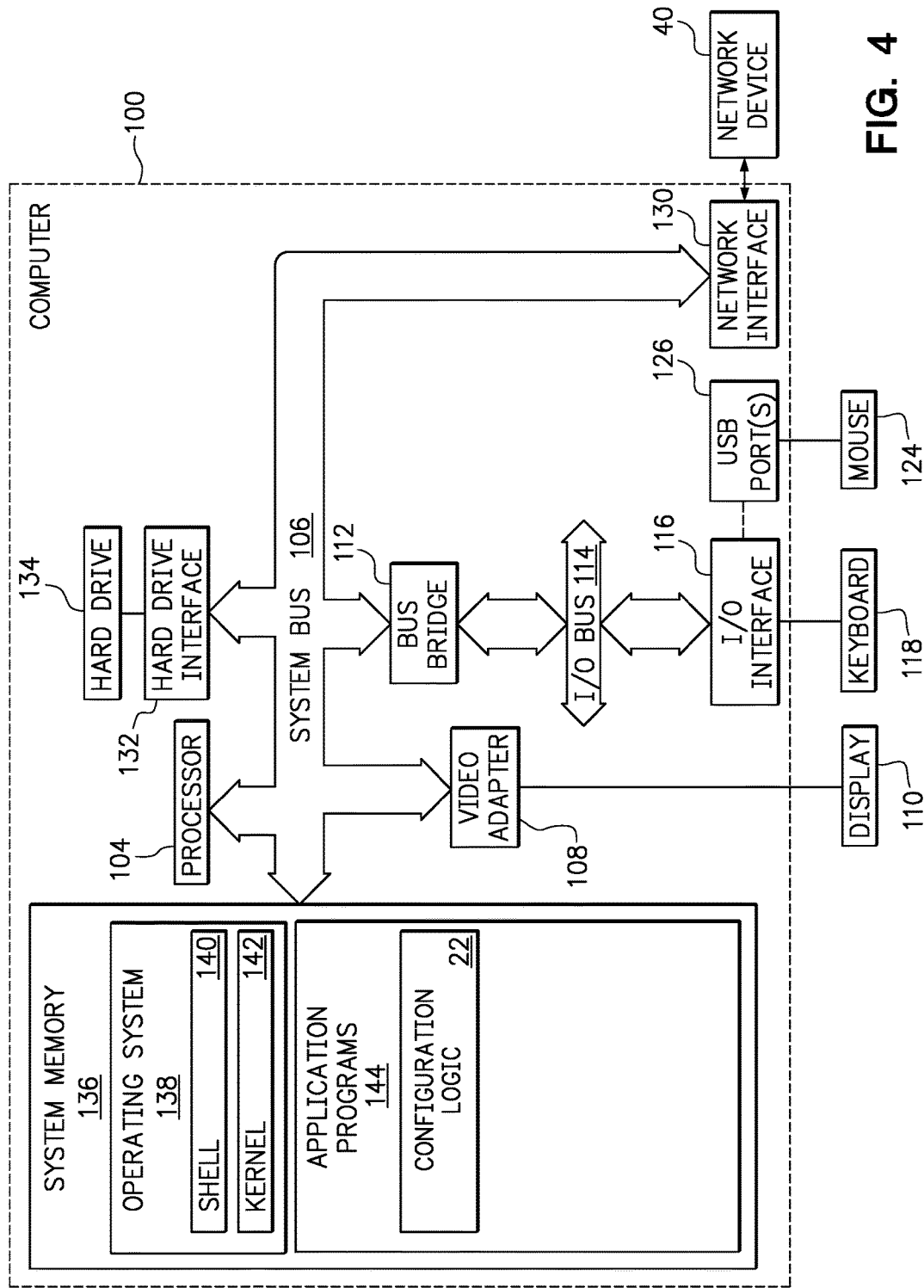
FIG. 4 is a diagram of a computer that is representative of a management system according to one or more embodiment of the present invention.

FIG. 4 is a diagram of a computer 100 that is representative of the management system 20 according to one or more embodiment of the present invention. The computer 100 includes a processor unit 104 that is coupled to a system bus 106. The processor unit 104 may utilize one or more processors, each of which has one or more processor cores. A video adapter 108, which drives/supports a display 110, is also coupled to system bus 106. The system bus 106 is coupled via a bus bridge 112 to an input/output (I/O) bus 114. An I/O interface 116 is coupled to the I/O bus 114. The I/O interface 116 affords communication with various I/O devices, including a keyboard 118, and a USB mouse 124 via USB port(s) 126. As depicted, the computer 100 is able to communicate with the network device 40 (see FIG. 1) using a network adapter or network interface controller 130.

A hard drive interface 132 is also coupled to the system bus 106. The hard drive interface 132 interfaces with a hard drive 134. In a preferred embodiment, the hard drive 134 communicates with system memory 136, which is also coupled to the system bus 106. System memory is defined as a lowest level of volatile memory in the computer 100. This volatile memory includes additional higher levels of volatile memory (not shown), including, but not limited to, cache memory, registers and buffers. Data that populates the system memory 136 includes the operating system (OS) 138 and application programs 144.

The operating system 138 includes a shell 140 for providing transparent user access to resources such as application programs 144. Generally, the shell 140 is a program that provides an interpreter and an interface between the user and the operating system. More specifically, the shell 140 executes commands that are entered into a command line user interface or from a file. Thus, the shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while the shell 140 may be a text-based, line-oriented user interface, the present invention may support other user interface modes, such as graphical, voice, gestural, etc.

As depicted, the operating system 138 also includes the kernel 142, which includes lower levels of functionality for the operating system 138, including providing essential services required by other parts of the operating system 138 and application programs 144. Such essential services may include memory management, process and task management, disk management, and mouse and keyboard management. As shown, the computer 100 includes application programs 144 in the system memory of the computer 100, including, without limitation, the configuration logic 22. The logic and data may be used to implement one or more of the embodiments disclosed herein. Optionally, one or more aspect of the configuration logic 22 may be implemented in the operating system 138, rather than in the application programs 144. While computer 100 may also be representative of a client device 30, the link-layer protocol packet generation and access control logic 34 (see FIG. 1) is preferably executed by a service processor 32 (see FIG. 1) that is not shown in FIG. 4.

The hardware elements depicted in the computer 100 are not intended to be exhaustive, but rather are representative. For instance, the computer 100 may include alternate memory storage devices such as magnetic cassettes, digital versatile disks (DVDs), Bernoulli cartridges, and the like. These and other variations are intended to be within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable storage medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. Furthermore, any program instruction or code that is embodied on such computer readable storage medium (including forms referred to as volatile memory) is, for the avoidance of doubt, considered "non-transitory".

Program code embodied on a computer readable storage medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored as program instructions on a non-transitory computer readable storage medium that can direct a computer, other programmable data processing apparatus, or other devices to function in a particular manner, such that the program instructions stored in the computer readable storage medium produce an article of manufacture including program instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
    forming, by a client device, a link-layer protocol packet having a field that includes first credentials of the client device;
    sending, by the client device, the link-layer protocol packet to a directly attached network switch while the client device is in a first configuration;
    storing, by the network switch, the first credentials in response to receiving the link-layer protocol packet from the client device, wherein the network switch stores the first credentials in a Management Information Base in association with a port identifier that identifies a port to which the client device is attached;
    a management system obtaining the first credentials from the network switch; and the management system using the first credentials to access the client device and change the client device from the first configuration to a second configuration.

2. The method of claim 1, further comprising:
generating, by an onboard management device of the client device, the first credentials as a function of a random string.

3. The method of claim 1, wherein forming a link-layer protocol packet having a field that includes first credentials of a client device, includes replacing predetermined content of a field of the link-layer protocol packet with the first credentials.

4. The method of claim 1, wherein the link-layer protocol is a link-layer discovery protocol.

5. The method of claim 1, wherein the first credentials are unique to the client device among a plurality of client devices directly attached to the network switch.

6. The method of claim 1, wherein the link-layer protocol packet is sent by an onboard management device of the client device.

7. The method of claim 6, wherein the onboard management device is selected from an integrated management module and a baseboard management module.

8. The method of claim 1, wherein the directly attached network switch is an Ethernet switch.

9. The method of claim 1, wherein the management system obtaining the first credentials from the network switch, include the management system reading the first credentials associated with a port to which the client device is directly attached.

10. The method of claim 1, wherein the management system obtaining the first credentials from the network switch, includes the management system obtaining port data from the network switch and parsing the port data to identify a field of the port data that has a character sequence matching an expected character sequence consistent with a credential.

11. The method of claim 1, wherein the network switch does not forward the link-layer protocol packet.

12. The method of claim 11, wherein the client device and the network switch use a bridge-filtered protocol in which the client device sends the link-layer protocol packet to an address that the network switch will not forward.

13. The method of claim 1, further comprising:
the management system obtaining credentials from the network switch for each of a plurality of client devices directly attached to the network device.

14. The method of claim 1, further comprising:
the management system replacing the first credentials of the client device with second credentials.

15. The method of claim 14, further comprising:
the management system preventing the client device from sending a link-layer protocol packet with the second credentials.

16. A method, comprising:
forming, by each of a plurality of client devices, a link-layer protocol packet having a field that includes first credentials of the client device;
sending, by each of the plurality of client devices, the link-layer protocol packet from the client device to a directly attached network switch while the client device is in a first configuration;
storing, by the network switch, the first credentials in response to receiving the link-layer protocol packet from each of the plurality of client devices, wherein the network switch stores, for each of the plurality of client devices, the first credentials of the client device in a Management Information Base in association with a port identifier that identifies a port to which the client device is attached;
a management system obtaining the first credentials of each of the plurality of client devices from the network switch; and
the management system using the first credentials of each of the plurality of client devices to access each of the client devices and change each of the client devices from the first configuration to a second configuration.

17. The method of claim 16, wherein the plurality of client devices includes a first plurality of client devices directly attached to a first network switch and a second plurality of client devices directly attached to a second network switch, and wherein the management system obtains the first credentials of each of the first plurality of client devices from the first network switch and the first credentials of each of the second plurality of client devices from the second network switch.

18. A computer program product comprising a non-transitory computer readable storage medium having program instructions embodied therewith, the program instructions executable by a processor to cause the processor to:
form, by a client device, a link-layer protocol packet having a field that includes first credentials of the client device;
send, by the client device, the link-layer protocol packet to a directly attached network switch while the client device is in a first configuration;
store, by the network switch, the first credentials in response to receiving the link-layer protocol packet from the client device, wherein the network switch stores the first credentials in a Management Information Base in association with a port identifier that identifies a port to which the client device is attached;
obtain, by a management system, the first credentials from the network switch; and
use, by the management system, the first credentials to access the client device and change the client device from the first configuration to a second configuration.

19. The method of claim 1, wherein the management system obtains the first credentials from the network switch by reading the Management Information Base.

20. The method of claim 19, wherein the management system reads the Management Information Base using a Simple Network Management Protocol.

* * * * *